United States Patent [19]

Yampolsky et al.

[11] Patent Number: 4,863,675

[45] Date of Patent: Sep. 5, 1989

[54] NUCLEAR POWER SYSTEM

[75] Inventors: Jack S. Yampolsky, San Diego; Leonardo Cavallaro, La Jolla; Kenneth F. Paulovich, Del Mar; Robert W. Schleicher, Carlsbad, all of Calif.

[73] Assignee: General Atomics, San Diego, Calif.

[21] Appl. No.: 657,754

[22] Filed: Oct. 4, 1984

[51] Int. Cl.[4] .................. G21C 9/00; G21C 15/02; G21C 19/28

[52] U.S. Cl. .................. 376/298; 376/299; 376/406; 376/905

[58] Field of Search ............ 376/378, 391, 380, 402, 376/905, 406, 298, 299; 60/651, 671

[56] References Cited

U.S. PATENT DOCUMENTS

| | | | |
|---|---|---|---|
| 2,902,425 | 9/1959 | Kosmin et al. | 376/905 |
| 3,068,159 | 12/1962 | Borst | 376/380 |
| 3,108,935 | 10/1963 | Penning et al. | 376/905 |
| 3,152,961 | 10/1964 | Ellard et al. | 376/905 |
| 3,158,546 | 11/1964 | Cordova | 376/203 |
| 3,203,867 | 8/1965 | Williams et al. | 376/905 |
| 3,242,981 | 3/1966 | Hutchinson et al. | 376/403 |
| 3,252,286 | 5/1966 | Whitelaw | 60/661 |
| 3,257,285 | 6/1966 | Clifford et al. | 176/33 |
| 3,284,312 | 11/1966 | West | 376/379 |
| 3,583,156 | 4/1969 | Schabert | 376/391 |
| 3,599,424 | 10/1968 | Yampolsky | 376/378 |
| 3,623,325 | 10/1968 | Jubb et al. | 376/391 |
| 3,712,851 | 1/1973 | Isberg et al. | 376/273 |
| 3,742,707 | 7/1973 | Andrews et al. | 376/394 |
| 3,755,076 | 8/1973 | Lindsley | 376/273 |
| 3,941,187 | 3/1976 | Jabsen et al. | 165/157 |
| 4,000,038 | 12/1976 | Moser | 376/273 |
| 4,000,617 | 1/1977 | Fortescue | 376/391 |
| 4,045,289 | 8/1977 | Seidensticker et al. | 376/295 |
| 4,098,329 | 7/1978 | Culver | 165/140 |
| 4,099,385 | 7/1978 | Silvesti, Jr. | 60/678 |
| 4,144,723 | 3/1979 | Morse et al. | 62/332 |
| 4,186,051 | 1/1980 | Buscher et al. | 376/203 |
| 4,224,795 | 9/1980 | Stiel et al. | 60/651 |
| 4,224,796 | 9/1980 | Stiel et al. | 60/651 |
| 4,355,001 | 10/1982 | Pierart | 376/317 |
| 4,367,194 | 1/1983 | Schenewerk et al. | 376/402 |
| 4,459,810 | 7/1984 | Enjo et al. | 60/651 |
| 4,503,337 | 3/1985 | Hafner et al. | 60/715 |
| 4,526,742 | 7/1985 | Hannerz | 376/282 |

FOREIGN PATENT DOCUMENTS 1098623 1/1968 United Kingdom .
2022911A 12/1979 United Kingdom .

OTHER PUBLICATIONS

Chemical Abstracts, vol. 57, No. 12, 1962, column 14663, Columbus, Ohio.
F. W. Bloch et al.: "Preparation and Properties of Fluorocarbons of Interest in Reactor Technology", U.S. Atomic Energy Comm. TID-7622, 109-20 (1962).

Primary Examiner—John F. Terapane
Assistant Examiner—Eric Jorgensen
Attorney, Agent, or Firm—Fitch, Even, Tabin & Flannery

[57] ABSTRACT

A nuclear power system comprises a plurality of modules disposed in below-grade pits to provide a compact, self-contained nuclear power supply. The modules are preferably individually transportable so that they may be substantially preassembled prior to installation. The system operates at relatively low temperatures and pressures, and includes various safety features which would prevent radioactive contamination of the surrounding environment in the event of a disturbance causing rupture of one or more of the odules or the pipes interconnecting the modules. The system also provides a low resistance flow path for vapor discharged from the turbine to improve efficiency.

8 Claims, 11 Drawing Sheets

NUCLEAR POWER SYSTEM

BACKGROUND OF THE INVENTION

The invention relates generally to nuclear power systems, and more particularly to a system employing a water cooled reactor.

The need for inherently safe nuclear reactors suitable for use in generation of electrical power led to the development of reactors of the type sold by GA Technologies Inc. and/or its predecessors under the trademark "Triga", such as that described in U.S. Pat. No. 3,257,285, which is assigned to GA Technologies Inc., the assignee of the present invention. One feature which contributes to the safety of Triga reactors is their employment of uranium-zirconium hydride (UZrH) fuel which imparts a large prompt negative temperature coefficient to the core, which inherently shuts down the reactor in the event of a large reactivity insertion.

The present invention provides a nuclear power system employing proven technology developed in connection with earlier Triga reactors in conjunction with various novel features set forth below.

SUMMARY OF THE INVENTION

It is a general object of the present invention to provide a compact, self-contained nuclear power supply.

It is a further object of the present invention to provide a compact nuclear power system which may be readily installed at a remote location with relatively little field work.

It is a further object of the present invention to provide a nuclear power system composed of a plurality of separate modules which may be individually preassembled prior to installation, and which may be removed and relocated after use at a particular location.

It is an additional object of the present invention to provide a nuclear power system providing relatively high fuel efficiency at low system temperatures and pressures.

It is an additional object of the present invention to provide a nuclear power system having passive means to ensure retention of fission products in the event of failure of one or more system components.

It is a further object of the present invention to provide a nuclear power system suitable for use at remote locations for defense or industrial applications.

An additional object of the present invention is to provide a nuclear power system which has a relatively low profile and which is relatively compact as viewed in plan.

An additional object of the present invention is to provide a nuclear power system having novel means for storage of fuel elements within the reactor vessel.

Further objects and features of the present invention will become apparent from the following description and the accompanying drawings.

DETAILED DESCRIPTION OF PREFERRED EMBODIMENTS

The present invention is generally embodied in a nuclear power system. A first embodiment of the invention is illustrated in FIGS. 1-4. A second embodiment is illustrated in FIGS. 5-8.

Four Module System

Referring first to the embodiment illustrated in FIGS. 1-4, the power for the system 10 is provided by a water-cooled reactor module 12. Water flows in a first fluid circuit wherein it enters the reactor module 12 at a temperature of about 330° F. and is heated therein to about 410° F.; flows through a heat exchanger module 14 which transfers heat from the water to a second fluid, cooling the water to about 330° F.; and is returned through pipes 13 by a pump 15 to the reactor module 12. Herein, the second fluid is R-114 fluorocarbon.

The R-114 fluid travels in a second fluid circuit wherein it enters the heat exchanger module 14 at a temperature of about 170° F. and a pressure of about 650 psia; is heated and evaporated in the heat exchanger module 14; leaves the heat exchanger module at about 370° F. and 600 psia; expands through a turbine 16; flows downwardly from the turbine 16 at about 220° F. and 44 psia into a recuperator 18 where it is cooled to about 120° F. at about 42 psia; exits the recuperator as a vapor and flows to a condenser module 20 where it is cooled to a temperature of about 95° F. at a pressure of about 42 psia; flows through pumps which raise its pressure to about 700 psia and its temperature to about 105° F.; flows back through the recuperator 18 (as liquid) and is heated by the vapor emerging from the turbine 16; leaves the recuperator at about 174° F. and 650 psia; and returns to the heat exchanger module 14 to be heated and evaporated.

An important aspect of the reactor system of the present invention is that it may be installed relatively easily, with relatively little on-site labor. To this end, the system is made up of a plurality of modules which may be assembled and tested in a factory prior to installation.

The system illustrated in FIGS. 1-4 essentially comprises four modules: the reactor module 12; the heat exchanger module 14; a power conversion module 22 comprising the recuperator 18 and a turbogenerator unit 24 which includes the turbine 16; and a condenser module 20. The modules 12, 14, 22 and 20 are disposed in below-grade pits so that their upper ends are accessible from above. All of the water piping is located at elevations near the upper ends of the respective modules. This ensures that the reactor core will remain covered with water in the event of a pipe leak. Similarly, all secondary fluid piping is located at elevations near the upper ends of the modules except for the condensate discharge. Each module includes a tank having a plurality of supports extending outwardly therefrom so that installation is relatively simple, essentially comprising lowering the modules into their pits, then connecting the piping from ground level.

The turbogenerator unit 24 and recuperator 18 of the power conversion module 22 may be installed in a two-part operation by first lowering the recuperator 18 into a pit, then installing the turbogenerator unit 24 atop the recuperator 18. To facilitate transportation of the modules 12, 14, 22 and 20 to an installation site, the modules are relatively small, and are preferably sized so as to be air shippable by C-141 air craft. The layout of the system enables each module to be independently removable.

A second important aspect of the reactor system of the present invention is that it is inherently safe in operation. The design of the reactor module contributes to the minimization of hazards as discussed below, and several other features further contribute to the safety of the system. One feature is that the pits are lined with a relatively impermeable material so as to provide containment for the working fluids in case of a massive rupture. This is particularly important in the case of the reactor vessel, as its pit ensures that, in the event of a rupture of the reactor vessel, the core will not be uncovered. In addition to providing containment, the reactor pit and the surrounding substrata provide shielding to enable persons to work in proximity to the reactor at ground level. Another safety feature lies in the elevation of the piping, which ensures that a rupture of intermodular piping will not result in drainage of liquid from any of the tanks. Also contributing to the safety of the system is the fact that it operates at relatively low temperatures and pressures. Use of an organic secondary fluid enables an efficient power conversion cycle to be maintained under such conditions. This enables the power conversion circuit to be independently hermetically sealed. Use of a fluorocarbon as a secondary fluid contributes to the safety of the system in that in the event of leakage, fluorocarbons generally do not present safety hazards as do certain other fluids having similar thermodynamic properties.

The above safety features obviate any need for a pressure retaining structure to contain fission products following accident conditions.

A third important aspect of the reactor system of the invention is that its layout reduces its vulnerability to military or terrorist attack. To this end, the system is relatively compact as viewed in plan, and has a relatively low profile, so as to present a small target. To enhance security, the pits may be hardened against explosives.

A fourth aspect of the system is its efficiency. One particular feature directed to obtaining high efficiency is the provision of flow paths for vapor flowing from the turbine to the condenser which offer relatively little resistance to flow.

The foregoing provides a general overview of the system illustrated in FIGS. 1-4. Set forth below are more detailed individual descriptions of each of the modules. These descriptions set forth further features of the invention in addition to those noted above.

Reactor Module 12

Figure 9:
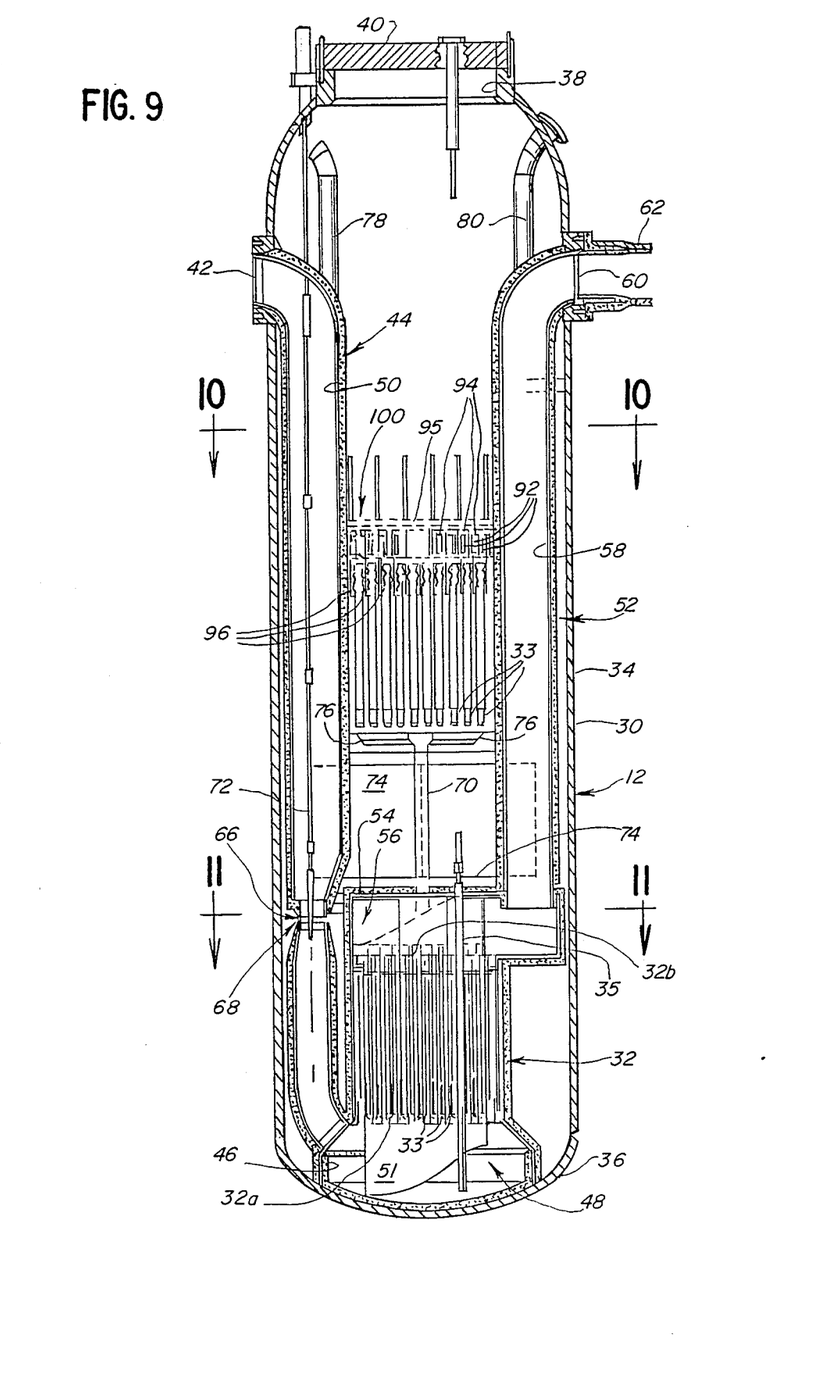
FIG. 9 is a longitudinal sectional view of a reactor module in accordance with the present invention.
Figure 10:
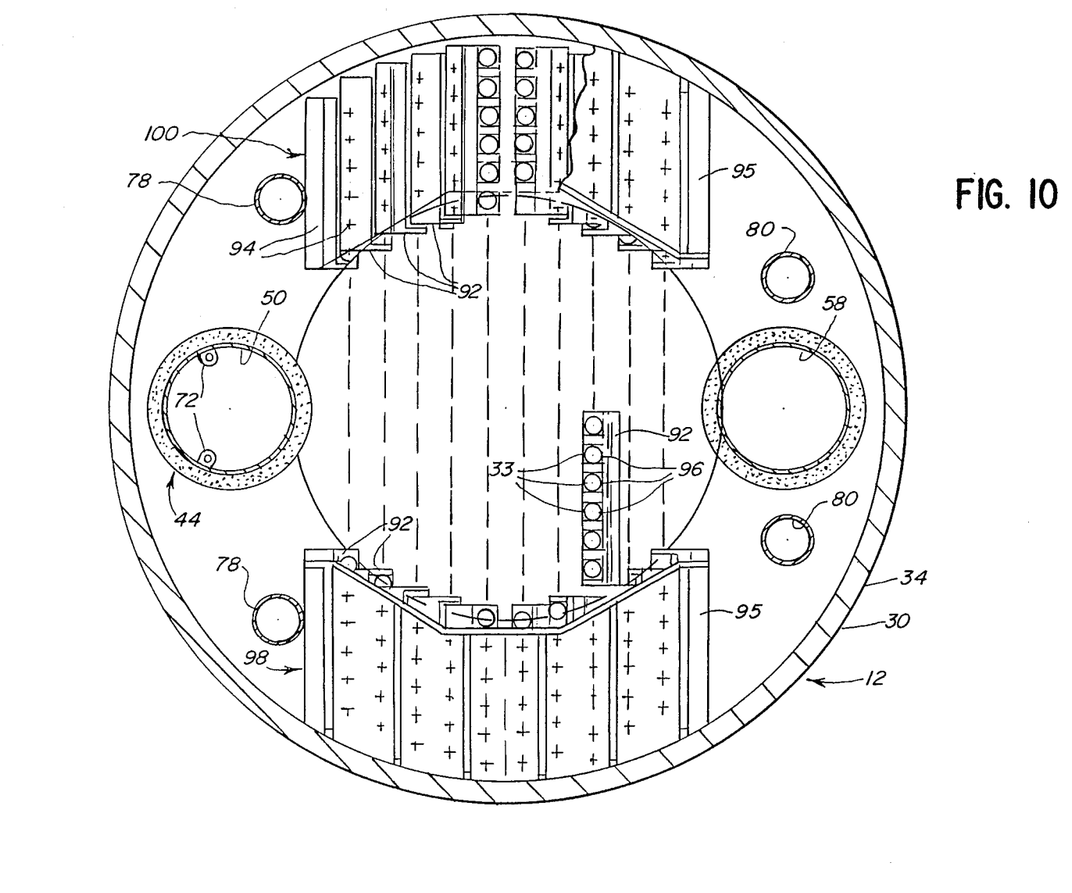
FIG. 10 is a sectional view of the reactor module shown in FIG. 9 taken substantially along line 10—10 in FIG. 9.
Figure 11:
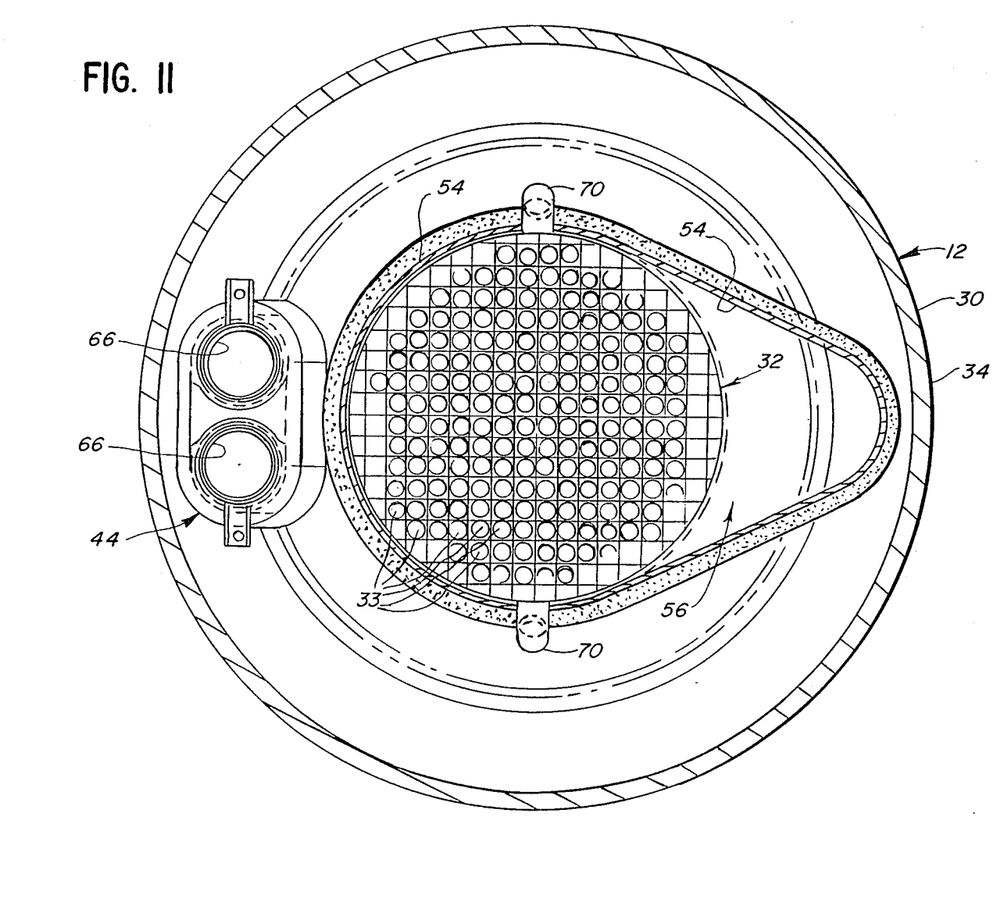
FIG. 11 is a sectional view of the reactor module shown in FIG. 9 taken substantially along line 11—11 in FIG. 9.

The reactor module 12 of the system illustrated in FIGS. 1-4, illustrated in greater detail in FIGS. 9-11, comprises a closed vessel or tank 30 having a core 32 supported therein near its lower end and including means to provide flow of a primary coolant through the core 32. The core 32 may be of the type described in U.S. Pat. No. 4,186,050, which is assigned to a predecessor of the assignee of the present invention, GA Technologies Inc. The core 32 includes a plurality of generally vertically oriented elongated fuel elements 33, and a plurality of control rods 35, one of which is shown in FIG. 9. The fuel elements exhibit high fission product retention capability, so that in the event of a primary coolant leak, the danger of environmental contamination is minimal. Each fuel assembly contains a plurality of fuel rods. Each fuel rod may have the following specifications:

| | |
|---|---|
| Overall length | 104.5 cm (41.1 in.) |
| Outside clad diameter | 1.377 cm (0.542 in.) |
| Overall weight | 600 g (1.33 lb) |
| Fuel outside diameter | 1.295 cm (0.510 in.) |
| Fuel length | 83.8 cm (33.0 in.) |
| Fuel composition | U—ZrH—Er |
| Weight of U-235 | 83 g (3 oz) |
| Uranium content | 45 wt % |
| Uranium-235 enrichment | 20% (nominal) |
| Hydrogen-to-zirconium ratio | 1.6 |
| Cladding material | Alloy 800 H |
| Cladding thickness | 0.041 cm (0.016 in.) |

The vessel 30 is an elongated tank of generally circular cross section comprising a generally cylindrical sidewall 34, a closed bottom 36 and a top access port 38 which has a removable cover plate 40 thereon. Removal of the cover plate 40 provides access to the interior of the vessel 30 through the port 38 for refueling, maintenance, etc.

The core 32 has a plurality of passages extending vertically from its lower end 32a to its upper end 32b to enable the flow of coolant therethrough. During normal operation, primary coolant enters the reactor vessel 30 through an inlet port 42 and travels therefrom through an inlet conduit system 44 to the core 32. The inlet conduit system 44 comprises an inlet chamber 46 providing an inlet plenum 48 beneath the core 32 and an inlet pipe 50 extending from the inlet port 42 to the inlet chamber. A flow distribution shroud 51 is provided in the inlet chamber 46 to distribute flow approximately evenly over the area of the lower end 32a of the core 32.

The coolant flows upwardly through the core 32 from the inlet plenum 48 to an outlet conduit system 52 which includes an outlet chamber 54 defining an outlet plenum 56 located above the core 32 and an outlet pipe 58 extending therefrom to an outlet port 60 near the upper end of the sidewall 34 of the vessel. The outlet port 60 communicates with an exterior pipe 62 which carries primary coolant to the heat exchanger module 14 for extraction of heat from the coolant.

The reactor module 12 contains a pool of relatively cool (e.g., 140° F.) water which substantially fills the vessel 30. The reactor module 12 includes a secondary or backup cooling system which employs the pool of cool water as a secondary coolant. Means are provided to enable circulation of the water from the pool through the core 32 to remove heat from the core 2 by natural convection in the absence of forced primary coolant circulation. To provide a path for flow of secondary coolant from the pool in the absence of forced coolant flow while inhibiting intermixing of the primary and secondary coolants during normal operation, the inlet conduit system 44 includes a pair of venturi throats 66 having gaps 68 therein, and the outlet conduit system 52 communicates with the pool through a pair of generally T-shaped spargers 70. Upon cessation of forced coolant circulation, the difference in density between the hot coolant in the core 32 and the relatively cold coolant in the pool causes coolant within the core 32 to rise, drawing secondary coolant into the inlet conduit system 52 through the gap 68 in the venturi throat 66, establishing circulation of water from the pool upwardly through the core 32 into the outlet chamber 54 and thence through the spargers 70 back into the pool.

The venturi throats 66 are configured to balance pressure between the gaps 68 in the venturi throat and the outlet plenum 56 so that substantially no pool water flows into or out of the flow path of the primary coolant during normal operation. Adjustment means 72 are provided to enable variation of the cross-section of the venturi throats 66.

Coolers 74 are located in the pool near the outlets 76 of the spargers 70. Each cooler 74 comprises a plurality of tubes having relatively cold (e.g., 75° F.) water flowing through them from an external source.

The exteriors of the tubes contact the pool water so as to remove heat from the pool. During operation of the backup cooling system, water flows out of the spargers 70 and through the coolers 74 over the tube exteriors. A pair of cooling water supply pipes 78 extend downwardly through the upper end of the reactor vessel 30 to the coolers, and a pair of discharge pipes 80 extend from the coolers to the upper end of the vessel 30. The respective pipes 78 and 80 are connected to external pipes 82 (FIG. 1) which communicate with the external source of cold water (not shown), which may be a pond or canal.

The coolant circulation system of the reactor module 12 is more fully described in co-pending U.S. patent application Ser. No. 645,907 entitled "Reactor With Natural Convention Backup Cooling System", which is assigned to the assignee of the present invention.

The provision of a large body of water above the core reduces the chance of core overheating in the event of a pipe break. In the embodiment illustrated in FIGS. 1–4 the bottoms of the inlet and outlet ports 42 and 60 are disposed about 19 ft. above the upper end of the core. In the event of a major pipe break, only a small percentage of the water in the vessel would flash to steam, and the core 32 would remain covered with water.

To support the vessel 30 in its pit 84, a plurality of support brackets 86 are provided on the exterior of the sidewall 34. Each support bracket 86 is adapted for placement on a generally planar horizontal surface 88 surrounding the pit 84 so that installation of the vessel 30 simply comprises lowering the vessel into the pit 84 to a depth at which the brackets 86 rest upon the surface 88. The brackets 86 may then be bolted or otherwise suitably anchored in place.

Each of the illustrated support brackets 86 comprises a horizontal plate 90 extending outwardly from the sidewall 34 and a pair of generally triangular, vertically oriented plates 91 extending between the horizontal plate 90 and the sidewall 34.

Pressure within the reactor vessel 30 is generally maintained higher than atmospheric pressure. The pressure within the vessel is preferably about 350 psia at its upper end. Regulation of pressure within the vessel 30 may be provided by pressurized nitrogen acting through a conventional bladder-type pressurizer 93 communicating with the pipe 62 connected to the outlet port 60. Alternately an electrically heated pressurizer may be used.

A feature of the reactor module 12 herein is that it includes retractable racks 92 disposed above the core 32 for the storage of fuel elements 33. The storage racks 92 are disposed in peripheral locations adjacent the vessel sidewall 34 when in a retracted position for storage of elements 33, allowing unobstructed access to the core 32 from the access port 38 above. The racks 92 can be pulled into the central area of the vessel interior in drawer-like fashion for loading or unloading fuel elements 33. The racks 92 are mounted on conventional telescoping supports 94 with linear bearings or bearing-mounted rollers. The supports 94 are fastened to bracketed support plates 95 which are attached to the sidewall 34 above the racks 92. The supports 94 may be made of stainless steel.

Each rack 92 has storage positions for several fuel elements 33, and includes a plurality of holders 96, each holder 96 having means for supporting an individual fuel element 33. The racks 92 are arranged into two groups or sets 98 and 100, one set on each side of the core. Each rack 92 is extendable no further than a plane bisecting the vessel 30 perpendicular to the direction of movement of the racks 92, which enables refueling operations to be carried out simultaneously by two independent operations, one associated with each set of racks 98, 100, without interference therebetween. The illustrated racks 92 contain storage space for 76 elements, equal to the number of fuel elements 33 in the core 32.

HEAT EXCHANGER MODULE 14

Figures 12, 13, 14:
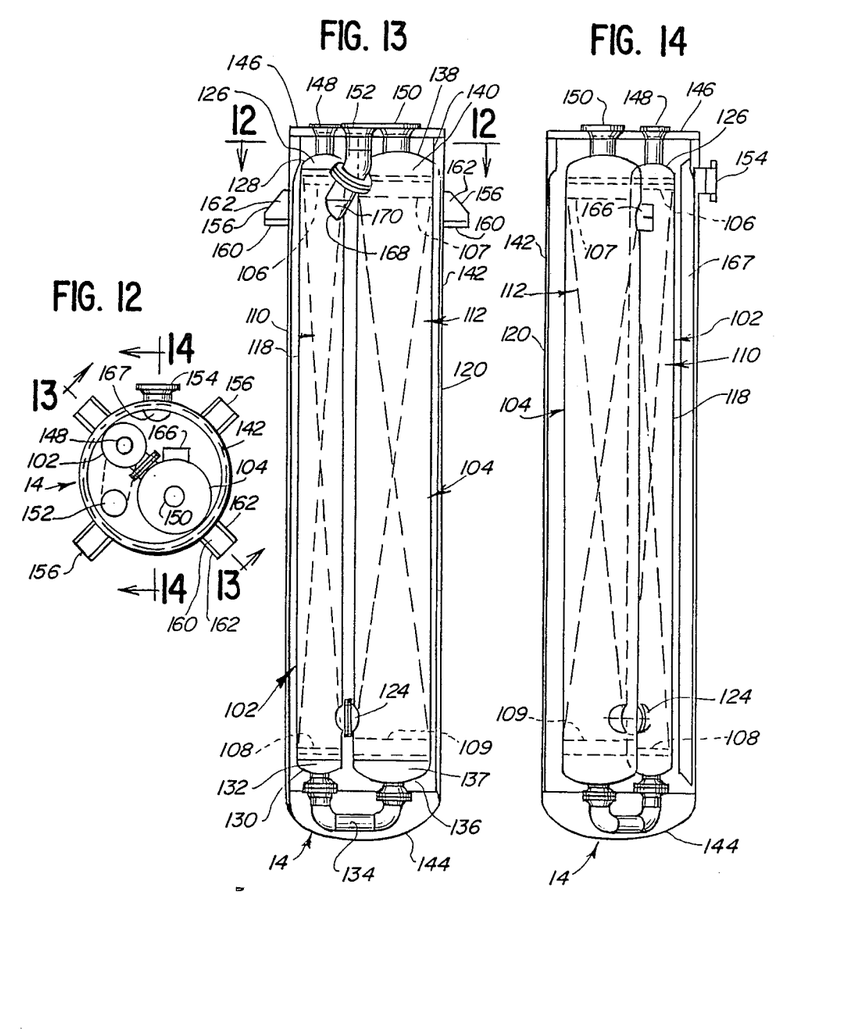
FIG. 12 is a transverse sectional view of the heat exchanger module of the nuclear power system of FIG. 1, taken substantially along line 12—12 in FIG. 13.
FIG. 13 is a sectional view of the module shown in FIG. 12 taken substantially along line 13—13 in FIG. 12.
FIG. 14 is a sectional view of the module shown in FIG. 12 taken substantially along line 14—14 in FIG. 12.

As stated above, the heat exchanger module 14 effects transfer of heat from the water which cools the reactor core to the R-114 fluid which drives the turbine 16. Referring particularly to FIGS. 12–14, the illustrated heat exchanger module 14 includes first and second heat exchangers 102 and 104 respectively through which the R-114 fluid and reactor water respectively flow in series in opposite directions. The counterflow thus achieved enables the desired heat transfer to be accomplished relatively efficiently.

In the illustrated heat exchanger module 14, each heat exchanger 102, 104 has an upper tube sheet 106, 107 and a lower tube sheet 108, 109 with a bundle of tubes 110, 112 surrounded by a generally cylindrical shell 118, 120 longitudinally extending therebetween. The R-114 fluid flows through the interiors of the tubes while the reactor water contacts the exteriors of the tubes. Thus, heat is transferred from the reactor water through the tube walls to the R-114 fluid.

The interiors of the shells 118, 120 of the respective heat exchangers 102, 104 communicate through a short connecting pipe 124 near their lower ends for flow of reactor water. An inlet plenum 126 is defined above the upper tube sheet 106 of the first heat exchanger 102 by a generally dome-shaped upper wall 128. A similarly shaped lower wall 130 defines an outlet plenum 132 beneath the lower tube sheet. A U-shaped connecting pipe 134 enables flow of R-114 fluid from the outlet plenum 132 of the first heat exchanger to the second heat exchanger 104. A generally dome-shaped lower wall 136 defines an inlet plenum 137 for the second heat exchanger 104 beneath the lower tube sheet 109 thereof, and a similarly shaped upper wall 138 defines an outlet plenum 140 adjacent an outlet port 142 near the upper end of the module 114.

The module has a generally cylindrical sidewall or shell 142 enclosing the two heat exchangers 102, 104 and has a generally dome-shaped bottom wall 144 to close the bottom of the module. The module further includes a generally flat, circular top wall 146 having an inlet port 148 for the R-114 fluid, an outlet port 150 for the R-114 fluid, and an outlet port 152 for the reactor water. The inlet port 154 for the water is located near the top of the sidewall 142.

Supports 156 are provided on the exterior of the outer shell 142 of the heat exchanger module 14 to support the module 14 when in its installed position in its pit 158. Preferably, four supports 156 are provided at equally spaced intervals about the circumference of the module 14 near its upper end. Each support 156 has a horizontal bottom wall 160 for resting on a support surface about the upper end of a pit, and two generally triangular sidewalls 162 for bracing the bottom support wall 160.

During operation, R-114 fluid flows in the inlet port 148 in the top wall 146 of the heat exchanger module 14; downwardly into the inlet plenum 126 of the first heat exchanger 102; downwardly through the interiors of the tubes in the tube bundle 110 to the outlet plenum 132; through the U-shaped connecting pipe 134 to the inlet plenum 137 of the second heat exchanger 104; through the lower tube sheet 109 and upwardly through the tubes in the tube bundle 112 of the second heat exchanger to the outlet plenum 140 thereof; and out through the outlet port 150 to a connecting pipe 164 which carries the R-114 fluid to the power conversion module 22. The reactor cooling water flows inwardly through the water inlet port 154 near the upper end of the sidewall 142 of the module 14; downwardly through a downcomer 167 to the bottom of the module 14; upwardly around the exteriors of the heat exchangers 102 and 104 to a water inlet port 166 near the upper end of the shell 120 of the second heat exchanger 104; downwardly about the exteriors of the tubes in the tube bundle 112 of the second heat exchanger 104 to the connecting pipe 124 between the shells of the respective heat exchangers; into the shell 118 of the first heat exchanger 102; upwardly along the exteriors of the tubes in the tube bundle 112 of the first heat exchanger to an outlet port 168 near the upper end of the shell 118 of the first heat exchanger 102; and through a short connecting pipe 170 to the water outlet port 152 in the top wall 146 of the module 14. One set of specifications which has been found acceptable for the illustrated heat exchanger module is set forth in the following table:

|  | First Heat Exchanger | Second Heat Exchanger |
| --- | --- | --- |
| No. of tube passes | 1 | 1 |
| No. of tubes | 800 | 800 |
| Tube O.D. (in.) | 0.625 | 0.625 |
| Wall T. (in.) | 0.065 | 0.049 |
| Tube pitch (in.) | 0.812 | 0.812 |
| Tube length (ft.) | 34.0 | 34.0 |
| Shell I.D. (in.) | 29.0 | 52.0 |
| Installed area (ft$^2$) | 4,451. | 18,359. |
| Effective area (ft$^2$) | 4,407. | 17,870. |
| Overall U (Btu/h ft$^2$ °F.) | 223. | 122. |
| Fouling (h ft$^2$°F./Btu) |  |  |
| Tube side | 0.0003 | 0.0003 |
| Shell side | 0.0003 | 0.0003 |
| Shell side pressure drop (psi) | 3.94 | 1.15 |
| Tube side pressure drop (psi) | 14.70 | 16.601 |
| Temperature (R-114 fluid in)(°F.) | 174. | 300. |
| Temperature (R-114 fluid out)(°F.) | 300. | 370. |
| Temperature (water in)(°F.) | 371.4 | 420. |
| Temperature (water out)(°F.) | 330.0 | 371.4 |
| Heat duty (MMBtu/h) | 94.9 | 88.7 |
| MTD (°F.) | 108.2 | 41.2 |
| R-114 flow rate (MMlb/h) | 2.5606 | 2.5606 |
| Water flow rate | 2.176 | 2.176 |

One feature of the illustrated heat exchanger module 14 is that the downcomer 167 provides a relatively long flow path for reactor cooling water between the water inlet port 154 and the area at which the water first contacts the tube exteriors. The purpose of this is to provide sufficient decay time for N-16 produced in the core to avoid potentially undesirable effects on the R-114 fluid in the tubes.

Power Conversion Module 22

As noted above, the power conversion module 22 of the illustrated system comprises a turbogenerator unit 24 mounted at the upper end of a recuperator 18. As also noted above, an advantage of the power conversion module 22 is that mounting of the turbogenerator unit 24 directly on the recuperator 18 enables the R-114 fluid vapor to flow directly from the turbine discharge into the inlet plenum of the recuperator 18 without change of direction, which reduces flow losses as compared with arrangements where the turbine and recuperator are connected by a pipe which changes direction.

Figure 4:
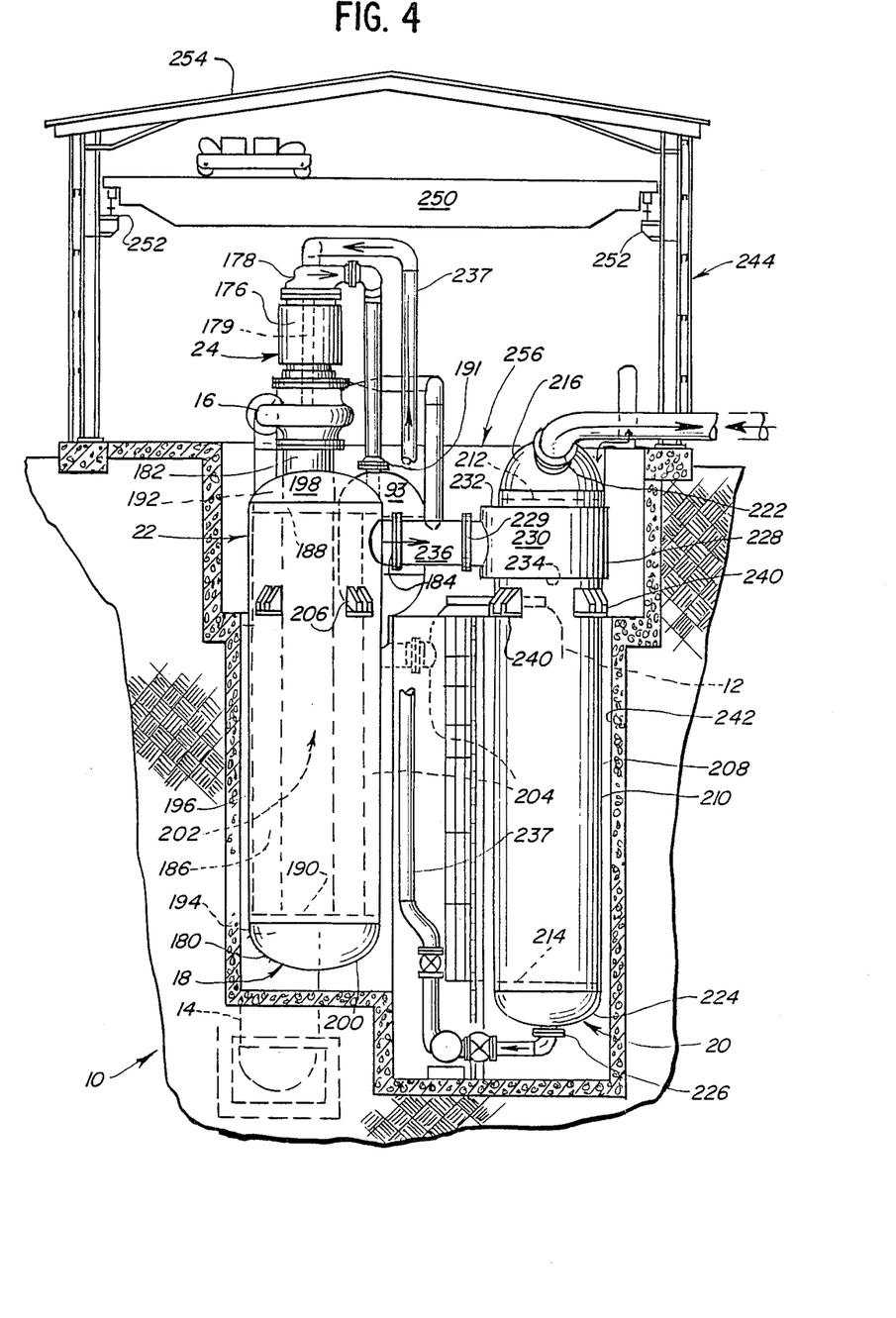
FIG. 4 is a sectional view of the system shown in FIG. 1 taken substantially along line 4—4 of FIG. 1, with portions broken away for clarity.
Figure 5:
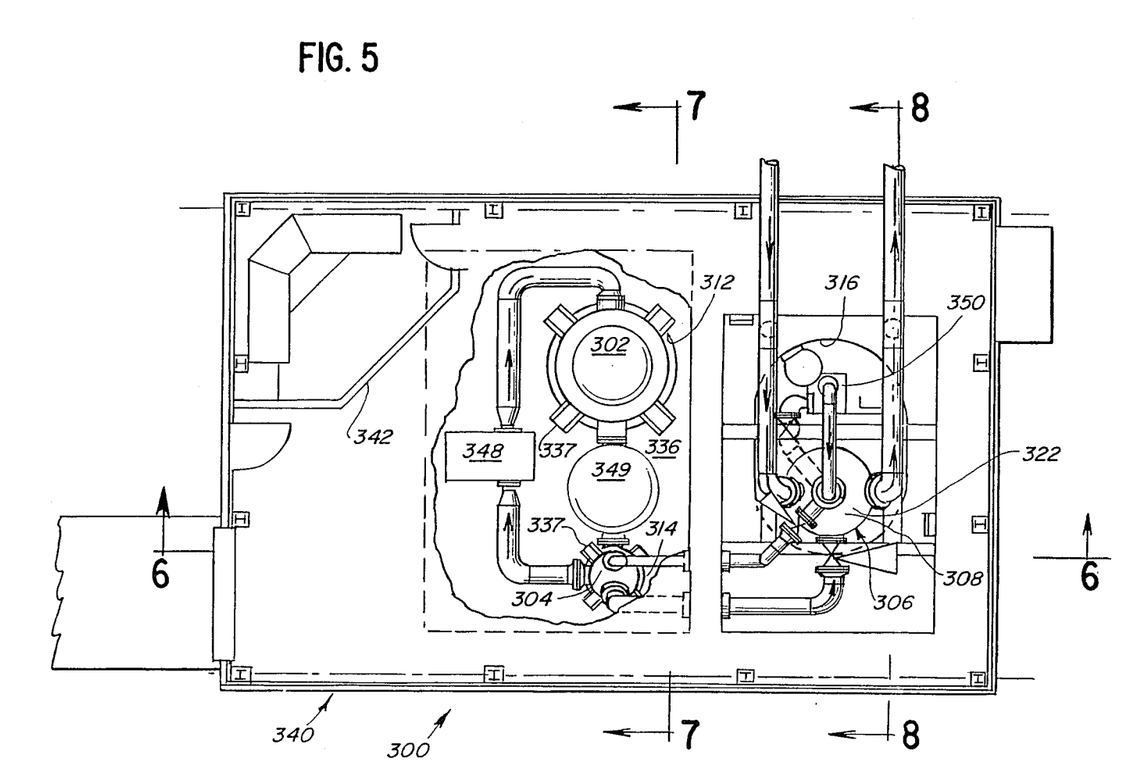
FIG. 5 is a plan view of a nuclear power system in accordance with a second embodiment of the present invention.
Figure 6:
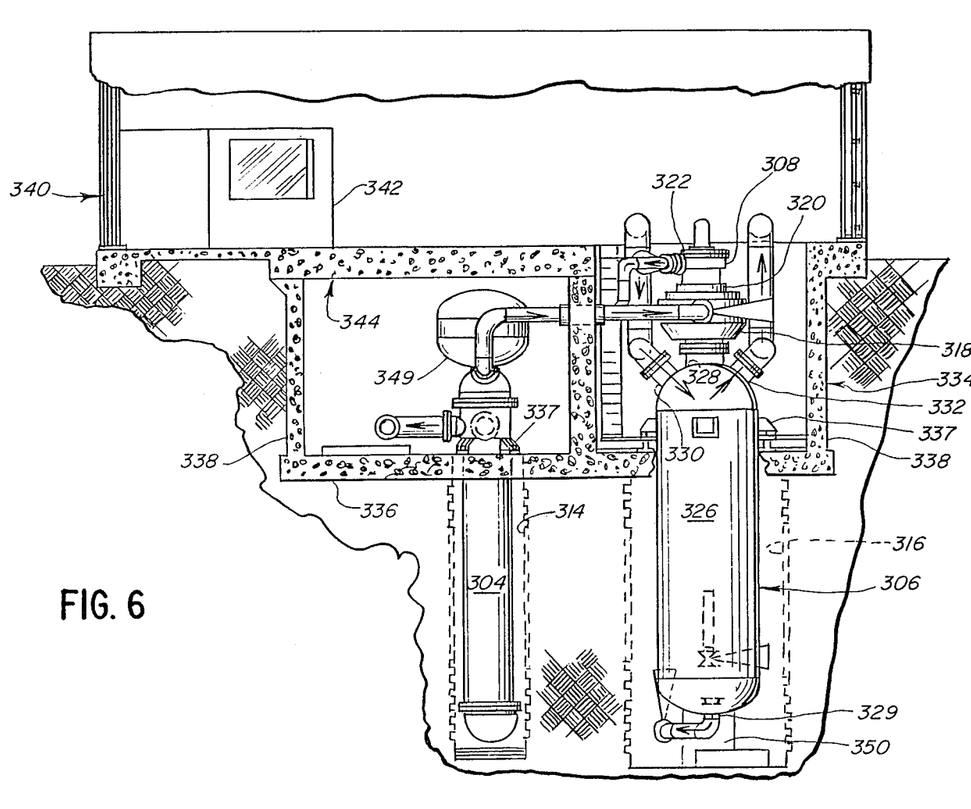
FIG. 6 is a sectional view of the system shown in FIG. 5 taken substantially along line 6—6 of FIG. 5, with portions broken away for clarity.
Figure 7:
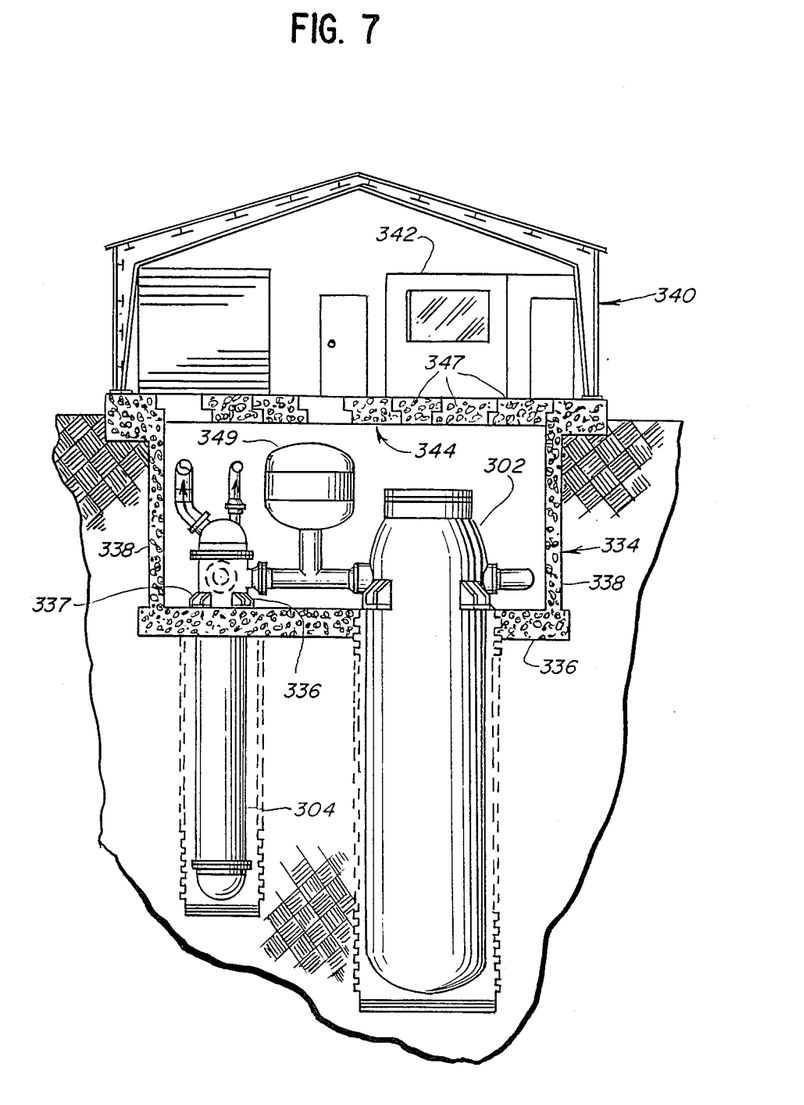
FIG. 7 is a sectional view of the system shown in FIG. 5 taken substantially along line 7—7 of FIG. 5.
Figure 8:
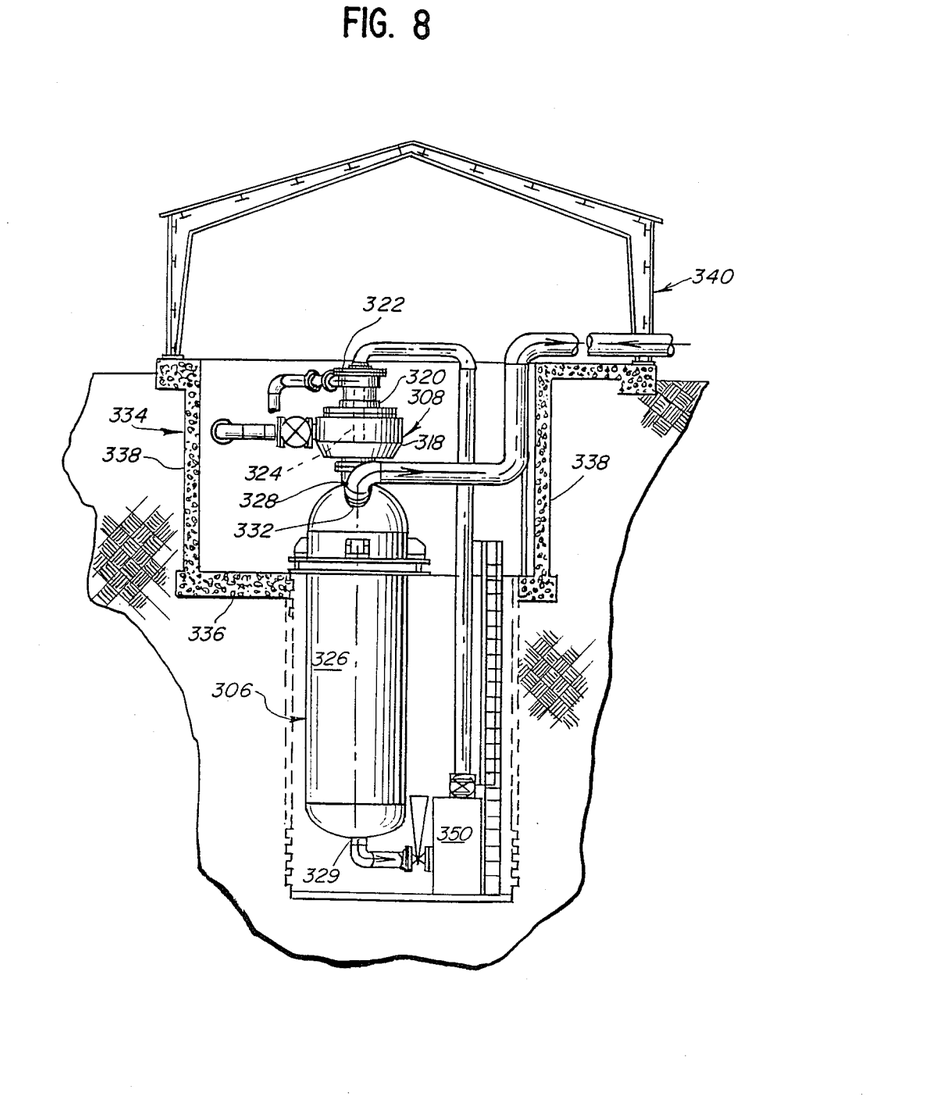
FIG. 8 is a sectional view of the system shown in FIG. 5 taken substantially along line 8—8 of FIG. 5.

The illustrated turbogenerator unit 24 is hermetically sealed with a single stage radial inflow turbine 16. The unit further includes an alternator or generator 176, and a pump 178 for pumping R-114 liquid through the recuperator 18 and the heat exchanger module 14. The turbine 16, generator 176, and pump 178 are mounted on a common vertical shaft 179 (FIG. 4). There are no shaft seals. The shaft 179 is supported in a conventional manner by thrust bearings (not shown). The R-114 fluid lubricates the bearings and cools the generator 176.

The recuperator 18 herein is described in greater detail in co-pending U.S. patent application Ser. No. 645,999, filed Aug. 30, 1984, which is assigned to the assignee of this invention. Very generally, the recuperator herein comprises a generally cylindrical tank 180 having an inlet port 182 for entry of R-114 vapor and an outlet port 184 for discharge of R-114 vapor after it has been cooled, and an annular bundle 186 of tubes (FIG. 4) disposed within the tank 180 for carrying R-114 liquid which has emerged from the condenser module 20. The tubes in the bundle 186 contact tube sheets 188 and 190 at their respective upper and lower ends. Upper and lower manifolds 192 and 194 respectively distribute liquid flow at the respective upper and lower ends of the tube bundle. R-114 liquid enters and exits the recuperator 18 through an inlet port 191 and an outlet port 193 respectively, in the upper manifold 192.

The tank 180 includes a generally cylindrical sidewall or shell 196 which encloses the tube bundle 186, and upper and lower walls 198 and 200 which provides the outer walls of the respective manifolds. The R-114 liquid flows through the interiors of the tubes, while the gas flows over the exteriors of the tubes so that heat is transferred from the gas to the liquid through the walls of the tubes. The interior of the recuperator may be referred to in terms of a "tube side", which includes the interiors of the tubes and manifolds for flow of liquid; and a "shell side" which includes the space outside of the tubes within the shell 196.

The annular tube bundle 186 has a generally cylindrical interior 202 having a longitudinal axis parallel to that of the generally cylindrical tank 180. The interior 202 of the annular tube bundle 186 is aligned with the inlet port 182 so as to define the inlet plenum for the vapor entering the recuperator 18. Thus, during operation, the vapor flows downwardly into the inlet plenum 202 and from there radially outwardly over the tubes to an outlet plenum 204 defined between the tube bundle 186 and the shell 196. Hence, in the outlet plenum 204, the vapor flows circumferentially and axially towards the gas outlet port 184. The various tubes in the annular tube bundle 186 are evenly distributed about the circumference of the bundle 186. The eccentric mounting of the tube bundle 186 within the tank 180 enables the flow of R-114 vapor to be relatively evenly distributed over the various individual tubes in the annular tube bundle 186.

The tubes are disposed vertically and are constrained at their upper and lower ends by the upper and lower tube sheets 188 and 190. The tube sheets 188 and 190 are perforated, with each perforation being sealed to a tube end. Except for the perforations, the tube sheets 188 and 190 are impermeable so as to prevent flow of gas longitudinally of the ends of the tubes outside of the tubes.

The tube sheets 188 and 190 are generally circular. The upper tube sheet 188 has a relatively large opening therein for flow of vapor into the inlet plenum.

Dividers (not shown) are provided in the manifolds 192, 194 to direct flow of the R-114 liquid in four passes through the tubes, effectively dividing the tubes into four annular coaxial groups. Each annular group preferably includes an equal number of tubes so as to provide approximate uniformity of flow rate among all of the tubes. The tubes are preferably finned on the shell side to improve heat transfer between the two fluids. Spirally fluted tubes could also be used to provide area extension of the tubes.

Radial flow outwardly from the inlet plenum is distributed relatively evenly along the length of the tube bundle 186. To improve the uniformity of flow distribution along the length of the tube bundle 186, an annular flow shroud (not shown) having a plurality of perforations therein may extend along the interior of the annular tube bundle, and an arcuate perforated baffle may be positioned along a portion of the outer diameter of the annular tube bundle adjacent the vapor outlet port 184.

To support the power conversion module 22 in its pit, supports 206 are provided on the exterior of the tank. The supports 206 are similar to those previously described in connection with the reactor module 12 and the heat exchanger module 14.

The following performance parameters may be maintained:

Vapor

| | |
|---|---|
| Flow rate | $1.56 \times 10^6$ lb/h |
| Inlet temperature/enthalpy | 221° F./107.19 Btu/lb |
| Outlet temperature/enthalpy | 120° F./88.46 Btu/lb |
| Inlet pressure | 44.2 psia |

Liquid

| | |
|---|---|
| Flow rate | $2.56 \times 10^6$ lb/h |
| Inlet temperature/enthalpy | 102° F./32.27 Btu/lb |
| Outlet temperature/enthalpy | 174° /51.0 Btu/lb |
| Inlet pressure | 702 psia |
| | $47.96 \times 10^6$ Btu/h |

Heat duty

The above performance parameters are provided by a configuration as specified below:
Fin O.D.=0.75 in.
Tube O.D.=0.502 in. (root diam.)
  11 fins/in.
Fin thickness=0.018 in.
Minimum wall thickness=0.031 in.
  Fin height=0.117 in.
Pitch=0.90 in.
7,688 tube lengths.
Shell I.D.: 104 in.
Tube length (total): 29.0 ft.
Effective length: 28.667 ft.
Shell nozzle I.D.:
  Outlet: 36.0 in.
  Inlet: 40.0 in.
Tube nozzle O.D.:
  Outlet: 12.1 in.
  Inlet: 12.1 in.
Total effective heat transfer area: 115,925 ft$^2$
Total installed heat transfer area: 116,428 ft$^2$
Shell pressure drop: 2.5 psi
Tube pressure drop: 13.0 psi
Material: Aluminum In this particular embodiment, the annular tube bundle 186 is offset by 3 in. from the center of the shell 196, the shell 196 has an inner diameter of 104 in., and the tube bundle 186 has an outer diameter of 93 in. Thus, the radial dimension of the outlet plenum 204 between the tube bundle 186 and the shell 196 varies about the circumference of the recuperator 18 from a minimum of 2.5 in. opposite the outlet port 184 to a maximum of 8.5 in. directly adjacent the outlet port 184.

Condenser Module 20

The condenser module 20 in the embodiment illustrated in FIGS. 1 through 4 comprises an elongated tank 208 having a generally cylindrical sidewall or shell 210 extending between a pair of tube sheets 212, 214, and a bundle of elongated vertically-oriented tubes (not shown) also extending between the tube sheets 212, 214 within the shell. Water from an external source is pumped through the tubes to remove heat from the vapor. As in the recuperator, the condenser may be referred to in terms of a "shell side" comprising the area in communication with the tube exterior, and a "tube side" comprising the area in communication with the tube interiors.

Figure 1:
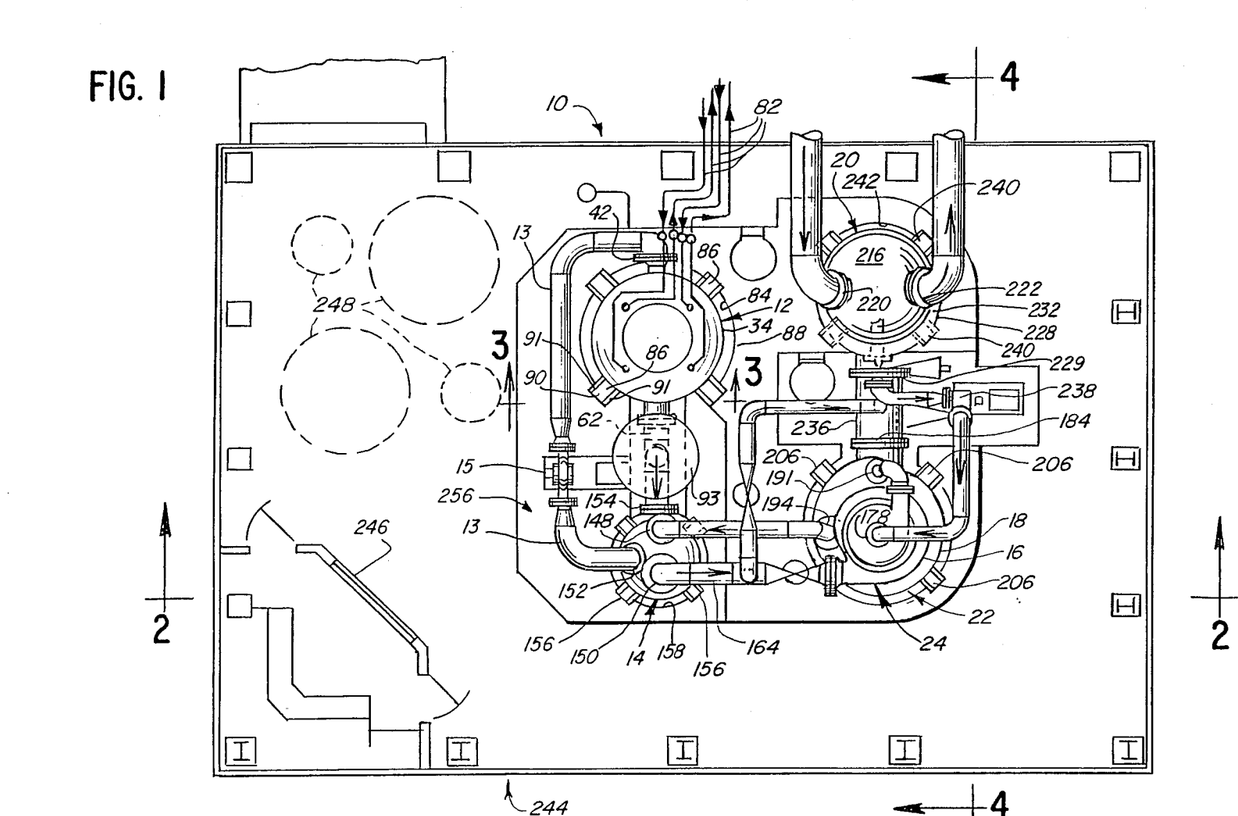
FIG. 1 is a partly diagrammatic plan view of a nuclear power system in accordance with a first embodiment of the present invention.
Figures 2, 3:
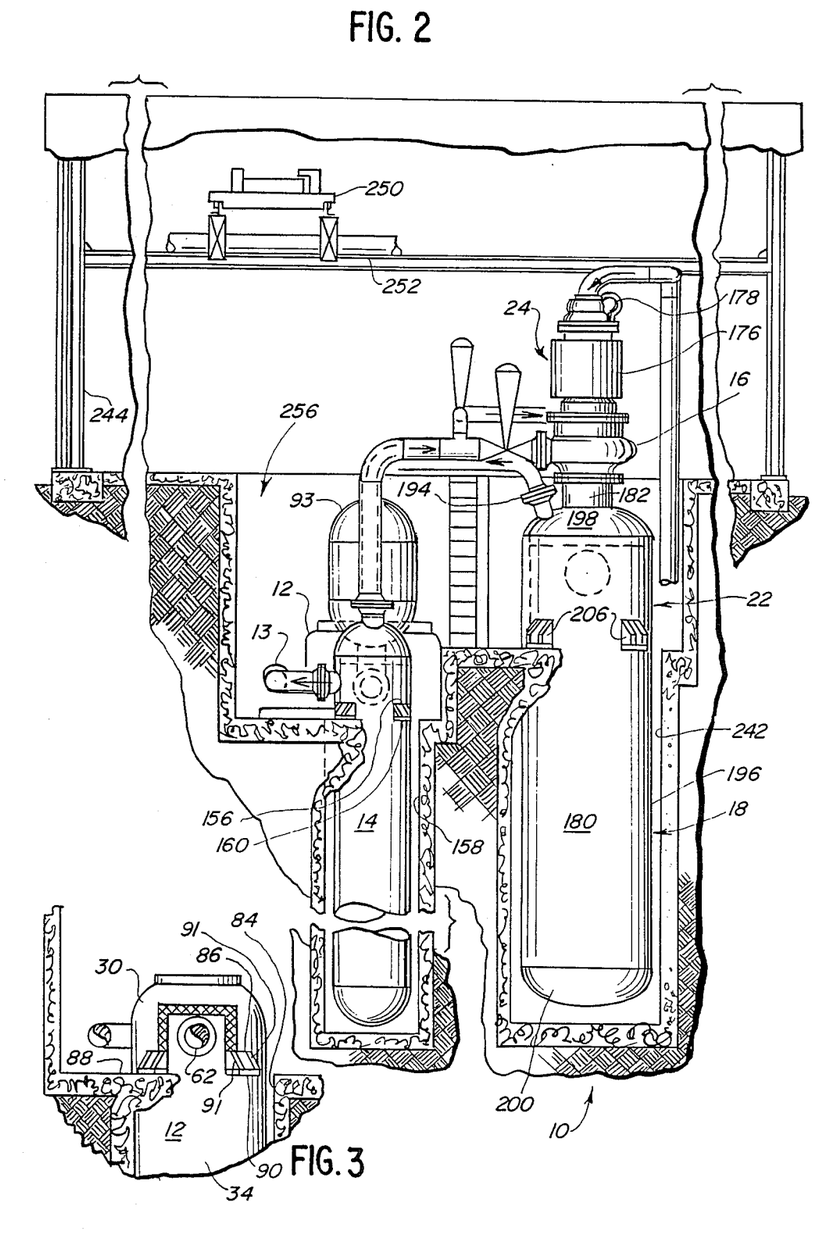
FIG. 2 is a sectional view of the system shown in FIG. 1 taken substantially along line 2—2 of FIG. 1, with portions broken away for clarity.
FIG. 3 is a sectional view of the system shown in FIG. 1 taken substantially along line 3—3 of FIG. 1, with portions broken away for clarity.

In addition to the cylindrical sidewall or shell 210, the tank 208 includes a head 216 having an inlet port 220 and an outlet port 222 therein for coolant flow, and a bottom section 224 having an outlet port 226 therein for condensate flow. To provide an inlet plenum for vapor entering the condenser, a peripheral vapor belt 228 having an inlet port 229 therein extends radially outward near the top of the shell 210 of the condenser module 20. The vapor belt 228 includes a generally cylindrical vertical sidewall 230 which is eccentrically positioned so as to provide a larger area adjacent the inlet port than on the opposite side, which provides relatively even distribution of vapor flow into the tube bundle about the circumference of the tube bundle. In addition to the vertical sidewall 230, the belt includes upper and lower horizontal walls 232 and 234, respectively. The condenser inlet port 229 is connected to the recuperator outlet port 184 by a short horizontal pipe 236. Suitable dividers may be provided in the head 216 and bottom 224 of the condenser to provide for flow of coolant in several passes through the tubes.

One advantage of the condenser 20 herein is that its configuration enables it to be connected to the recuperator 18 by the short horizontal pipe 236 without change in direction of vapor flow therein, which minimizes flow losses between the recuperator 18 and condenser 20 and improves the overall efficiency of the system.

Condensate leaves the condenser 20 through the outlet port 226 and from there is pumped through a return pipe 237 to the recuperator 18 where it is circulated through the tube side of the recuperator 18. Pumping of the condensate is accomplished by two pumps 178 and 238, one 238 located near the bottom of the condenser, and the other 178 located at the upper end of the turbogenerator unit 24.

As with the modules previously described, the condenser 20 includes supports 240 on its exterior to enable it to be easily installed in its pit 242.

The condenser 20 may have the following specifications:

| | |
|---|---|
| Tube type | Spirally fluted |
| No. of tube passes | 2 |
| No. of tubes | 3500 |
| Tube O.D. (in.) | 1.00 |
| Wall T. (in.) | 0.020 |
| Tube pitch (in.) | 1.3 |
| Tube length (ft.) | 34.3 |
| Shell I.D. (in.) | 88.0 |
| Installed area (ft$^2$) | 43,982. |
| Effective area (ft$^2$) | 43,493. |
| Overall U (Btu/h ft$^2$ °F./Btu) | 251. |
| Fouling (h ft$^2$ °F./Btu) | |
| Tube side | 0.001 |
| Shell side | 0.0003 |
| Shell side P (psi) | 1.26 |
| Tube side P (psi) | 5.72 |
| Temperature (R-114 fluid) in (°F.) | 121.0 |
| Temperature (R-114 fluid) out (°F.) | 95.0 |
| Temperature (water) in (°F.) | 72.0 |
| Temperature (water) out (°F.) | 88.0 |
| Heat duty (MMBtu/h) | 148.9 |
| MTD (°F.) | 14.05 |

| -continued | |
|---|---|
| Flow rate (MMlb/h) | 2.5606 |
| Cooling water flow rate (MMlb/h) | 9.301 |

The above-described system 10 may be housed in a building 244 of conventional construction. As noted above, because of the various safety features, the building 244 need not be designed to provide containment.

The building 244 includes a control roon 246 and provides areas 248 for storage of rector internals, etc. A 30 ton electric overhead traveling crane 250 runs on rails 252 along the length of the building 244 to aid in installation of piping, etc. Installation of the modules requires a larger field crane (not shown), and is accomplished prior to installation of the building roof 254.

The structure of the pits herein provides a relatively large recess 256 which is shared by the upper ends of all four modules, and three separate pits 84, 158 and 242 extending downwardly from the recess 256; one pit 84 for the reactor module 12, one 158 for the heat exchanger module, and one 242 shared by the power conversion module 22 and condenser 20. Provision of a separate pit 84 containing only the reactor module 12 aids in containment of reactor water in the event of a rupture of the reactor vessel 12, and also aids in effectively shielding the core 32. Similarly, the provision of a separate pit 158 for the heat exchanger module 14 reduces the drop in the level of the pool which could result from a rupture of the shell 142 of the heat exchanger module 14.

The system illustrated in FIGS. 1 through 4 is designed for electric output of about 10 megawatts. The reactor heat output is about 53 megawatts, which yields a net efficiency of about 19%.

Three Module System

FIGS. 5 through 8 illustrate a system 300 in accordance with a second embodiment of the invention, designed for output of about three megawatts. The system 300 includes a water cooled reactor module 302 which is somewhat smaller than the reactor module 12 described above, but is essentially identical in structure to the reactor module illustrated in FIGS. 9 through 11. The system 300 further includes a heat exchanger module 304 similar to that employed in the above-described system 10, and a power conversion module 306 which comprises a turbogenerator unit 308 similar to that of the above-described system 10, and a condenser 310. The system 300 of FIGS. 5 through 8 has only three modules 302, 304, 306 as condensation of vapor emerging from the turbogenerator unit 308 is effected in the power conversion module 306.

The turbogenerator unit 308 includes a turbine 318, a generator 320 and a pump 322 sharing a common vertical shaft 324. The turbine 318 is substantially identical to that employed in the system described in FIGS. 1 through 4. The generator 320 and pump 322 are smaller due to the lower power output of the system 300.

The condenser 310 herein is similar to the recuperator 18 described above in its general configuration. Thus, it includes an outer shell or tank 326 which is generally cylindrical, and which has a vapor inlet port 328 at its upper end which enables vapor to be discharged directly from the turbine 318 into the center of an annular bundle of tubes (not shown) disposed within the tank. The vapor condenses as it flows radially outwardly across the tube exteriors, and exits the condenser through a condensate drain 329. Cooling water from an external source enters the tank through a cooling water inlet port 330, flows through the tubes in the tube bundle, and exits the tank at a cooling water discharge port 332.

The system 300 illustrated in FIGS. 5 through 8 is disposed entirely below grade, with a building 340 housing a control room 342 located above. The upper ends of the modules are contained within a large, relatively shallow pit 334 having its bottom 336 and sides 338 lined with concrete. The lower portions of the modules are contained in three deeper pits 312, 314 and 316 extending downward from the bottom 336 of the pit 334. Support brackets 337 support the modules. To prevent radioactive contamination of the environment, the reactor and heat exchanger modules 302 and 304 are shielded so as to be isolated from the power conversion module and the building above. To this end, a horizontal wall 344 which functions as the floor of the building 340 extends over the reactor and heat exchanger modules 302 and 304, and a vertical divider wall 346 separates the reactor and heat exchanger modules 302 and 304 from the power conversion module 306. The horizontal wall is preferably composed of a plurality of removable sections 347 to facilitate access to the reactor and heat exchanger.

During operation, water flows in a first fluid circuit wherein it enters the reactor module 302 at above 300° F.; is heated in the reactor module 302 to about 340° F.; flows through the heat exchanger module 304 where it transfers heat to the secondary fluid; and flows through a pump 348 which returns it to the reactor module. The first fluid circuit is pressurized by a conventional pressurizer 349. Pressure within the reactor module 302 is preferably maintained at about 250 psia at the upper end.

The secondary fluid is preferably refrigerant R-113 fluorocarbon. The R-113 fluid enters the heat exchanger module 304 at about 95° F. and 190 psia; is heated and evaporated; leaves the heat exchanger module 304 at about 300° F. and 176 psia; expands through the turbine 318 and is discharged downwardly from the turbine 318 at a temperature of about 166° F. and a pressure of about 10 psia; is cooled by the condenser 310 to a temperature of about 93° F. at a pressure about 9.5 psia; and flows through pumps 350 and 322 which raise its pressure to about 190 psia and its temperature to about 95° F. and return it to the heat exchanger module 304. The reactor power output is about 18 megawatts, which yields a net efficiency of about 18%.

From the foregoing it will be appreciated that the present invention provides a novel nuclear power system. While preferred embodiments have been illustrated and described herein, there is no intent to limit the invention to any particular embodiments.

What is claimed is:

1. An inherently safe modular nuclear power system for producing electrical power at acceptable efficiency levels using working fluids at relatively low temperatures and pressures, said system comprising:
   a reactor module for heating a first fluid;
   a heat exchanger module for transferring heat from said first fluid to a second fluid;
   a first piping system effecting flow of said first fluid in a first fluid circuit successively through said reactor module and said heat exchanger module;
   a power conversion module comprising a turbogenerator driven by said second fluid, and means for cooling said second fluid upon emergence thereof from said turbogenerator;
   a second piping system comprising means for effecting flow of said second fluid in a second fluid circuit successively through said heat exchanger module and said power conversion module;
   and a plurality of pits for receiving said modules;
   each of said modules being elongated and having an upper end and a lower end, and being disposed in a substantially vertical orientation with a lower portion contained in one of said pits;
   said reactor module and said heat exchanger module having means for connection with said first piping system near their respective upper ends;
   each of said modules including a tank having support means thereon enabling said tank to be installed in an associated pit from above;
   said modules being located side-by-side in close proximity to one another to provide compactness for the system while permitting overhead access to each of the modules without interference from any other module;
   said reactor module comprising a tank, a core supported within said tank and disposed near the lower end of said tank, a pool of relatively cool liquid contained within said tank surrounding said core, means to selectively permit circulation of said liquid from said pool through said core by natural convection in the event of interruption of flow of said first fluid through said reactor module while inhibiting intermixing of said liquid from said pool with said primary coolant under normal conditions, and a plurality of coolers disposed within said reactor module to remove heat from said pool;
   the pit which receives said reactor module being lined with a relatively impermeable material so as to provide secondary containment for said pool so that said core will remain surrounded by said relatively cool liquid in the event of a rupture of said tank;
   said piping systems and modules maintaining separation between said first and second fluids;
   said core comprising a fuel which imparts a large prompt negative temperature coefficient to the core, which inherently shuts down the reactor in the event of a large reactively insertion;
   said second fluid being a member of the group consisting of R-113 and R-114.

2. A system in accordance with claim 1 wherein said means for cooling said second fluid is a recuperator which cools said second fluid without change of phase, said system further comprising a condenser module, said second piping system further comprising means for effecting flow of said second fluid through said condenser.

3. A system in accordance with claim 2 wherein said means for effecting flow of said second fluid through said condenser includes a substantially horizontal straight pipe extending from said recuperator to said condenser to enable said second fluid to flow directly from said recuperator to said condenser without changing direction.

4. A system in accordance with claim 1 wherein said turbogenerator comprises a turbine and a generator supported for rotation on a common vertical shaft, and wherein said means for cooling said second fluid upon emergence thereof from said turbogenerator includes an annular tube bundle defining a central plenum directly beneath said turbine, whereby said second fluid flows downwardly from said turbine into said inlet plenum without changing direction.

5. A system in accordance with claim 4 wherein said means for cooling said second fluid upon emergence thereof from said turbine is configured so that said second fluid flows downwardly into said inlet plenum from said turbine and thence radially outwardly through said tube bundle.

6. A system in accordance with claim 1 wherein said means for cooling said second fluid is a condenser.

7. A system in accordance with claim 1 wherein said means for cooling said second fluid upon emergence thereof from said turbogenerator includes an annular tube bundle defining a central plenum for receiving said second fluid, and wherein said power conversion module is configured to enable said second fluid to flow from said turbine into said central plenum without changing direction.

8. A modular nuclear power system in accordance with claim 1 wherein said fuel comprises uranium zirconium hydride fuel.

* * * * *